United States Patent
Ogino et al.

(10) Patent No.: US 6,954,472 B2
(45) Date of Patent: Oct. 11, 2005

(54) METHOD AND DEVICE OF SUPERIMPOSING AN ADDITIONAL INFORMATION SIGNAL ON A VIDEO SIGNAL AND DETECTING SAID ADDITIONAL INFORMATION FROM SAID VIDEO SIGNAL

(75) Inventors: Akira Ogino, Tokyo (JP); Nozomu Ikeda, Tokyo (JP); Yuji Kimura, Kanagawa (JP); Hisayoshi Moriwaki, Tokyo (JP); Takashi Kohashi, Tokyo (JP)

(73) Assignee: Sony Corporation, Tokyo (JP)

( * ) Notice: Subject to any disclaimer, the term of this patent is extended or adjusted under 35 U.S.C. 154(b) by 925 days.

(21) Appl. No.: 09/934,621

(22) Filed: Aug. 22, 2001

(65) Prior Publication Data

US 2002/0001319 A1 Jan. 3, 2002

Related U.S. Application Data

(62) Division of application No. 09/145,428, filed on Sep. 1, 1998, now Pat. No. 6,295,303.

(30) Foreign Application Priority Data

Sep. 2, 1997 (JP) .......................................... P9-237277

(51) Int. Cl.[7] ................................................. H04J 3/12
(52) U.S. Cl. ..................................................... 370/527
(58) Field of Search ................................. 370/527, 515, 370/529, 441, 479, 503, 514, 528

(56) References Cited

U.S. PATENT DOCUMENTS

| | | | |
|---|---|---|---|
| 5,541,552 A | * | 7/1996 | Suzuki et al. ............... 329/307 |
| 6,058,243 A | | 5/2000 | Ogino et al. |
| 6,195,129 B1 | | 2/2001 | Ogino et al. |
| 6,263,153 B1 | | 7/2001 | Ogino et al. |

* cited by examiner

*Primary Examiner*—Chi Pham
*Assistant Examiner*—Alexander O. Boakye
(74) *Attorney, Agent, or Firm*—Jay H. Maioli

(57) ABSTRACT

A method of superimposing additional information on a video signal, transmitting it, and detecting the additional information from the transmitted video signal. The additional information is synchronized with a sync signal in the video signal, and generated in N (N≧1) unit intervals of one field of the video signal. Some predetermined unit intervals of the additional information generated in N (N≧1) unit intervals of one field of the video signal, are phase-inverted. The additional information is identified by detecting the information in unit intervals based on the sync signal in the video signal, and detecting that information in some predetermined unit intervals is inverted. The additional information is identified by detecting the information in unit intervals, and integrating the detection results with the information in inverted predetermined unit intervals inverted.

8 Claims, 14 Drawing Sheets

F I G. 1
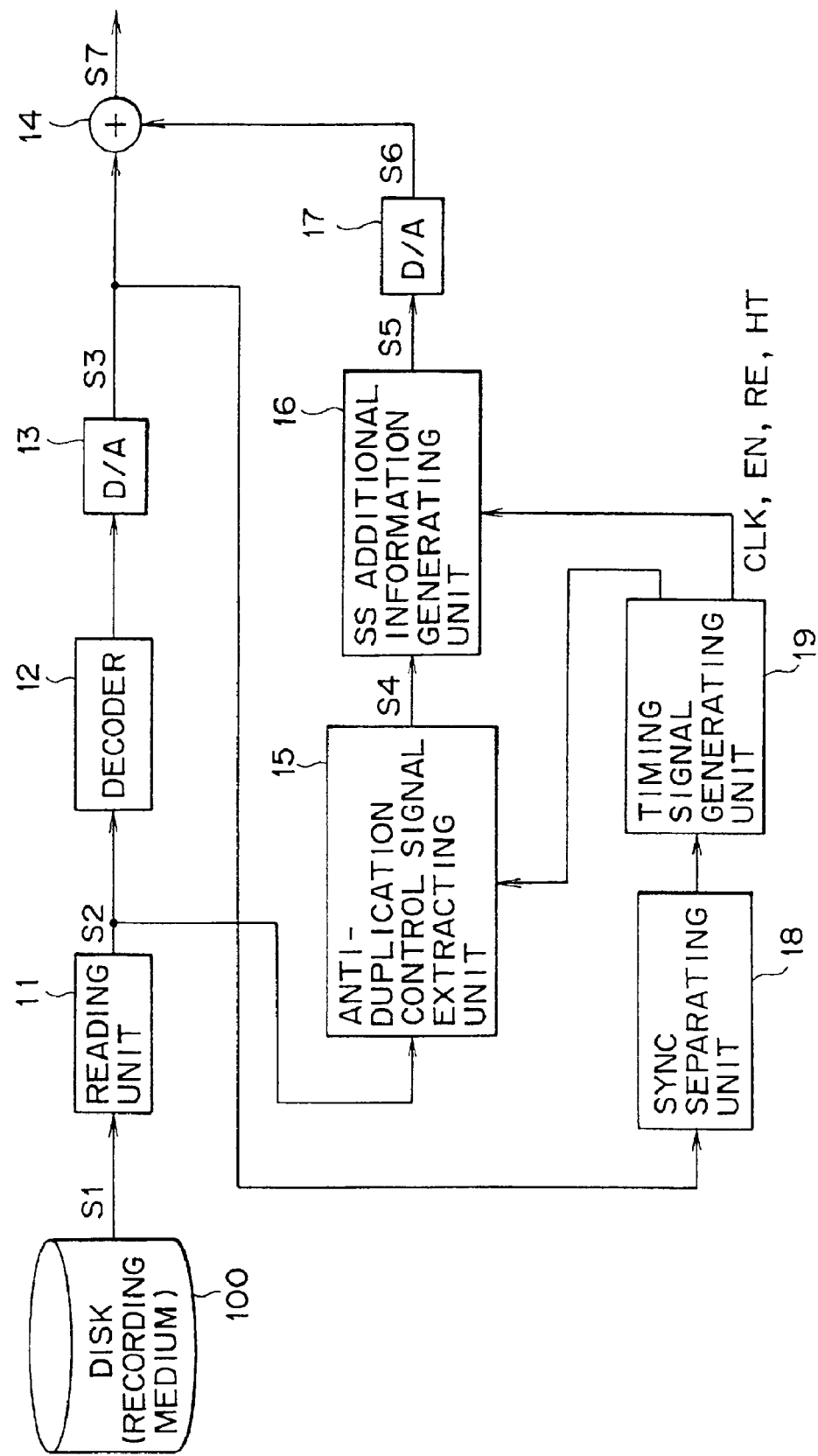

ANTI-DUPLICATION CONTROL SIGNAL SPECTRUM
BEFORE SPECTRAL SPREADING

ANTI-DUPLICATION CONTROL SIGNAL SPECTRUM
AFTER SPECTRAL SPREADING

SPECTRUM OF INFORMATION SIGNAL ON WHICH SS ANTI-DUPLICATION CONTROL SIGNAL IS SUPERIMPOSED

SIGNAL SPECTRUM AFTER SPECTRAL DESPREADING ON RECORDER SIDE

| | | 0 (NON-INVERTING INTERVAL) | | 0 (INVERTING INTERVAL) | |
|---|---|---|---|---|---|
| FIG. 10A | ADDITIONAL BIT | 0 | 1 | 1 | 0 |
| FIG. 10B | SS SIGNAL | 0 | 1 | 0 | 1 |
| FIG. 10C | PN CODE (DETECTION SIDE) | 0 (+) | -1 (-) | 0 (+) | -1 (-) |
| FIG. 10D | A/D OUTPUT (VIDEO PART) | 100 | 200 | 100 | 200 |
| FIG. 10E | ADDITION/ SUBTRACTION VALUE | 100 | -100 | 10 | 40 | 100 | -100 | -110 | 40 |
| FIG. 10F | D/A OUTPUT (SS SIGNAL PART) | 1 | -1 | -1 | 1 | -1 | 1 | 1 | -1 |
| FIG. 10G | ADDITION/ SUBTRACTION VALUE | 1 | 2 | 3 | 4 | -1 | -2 | -3 | -4 |

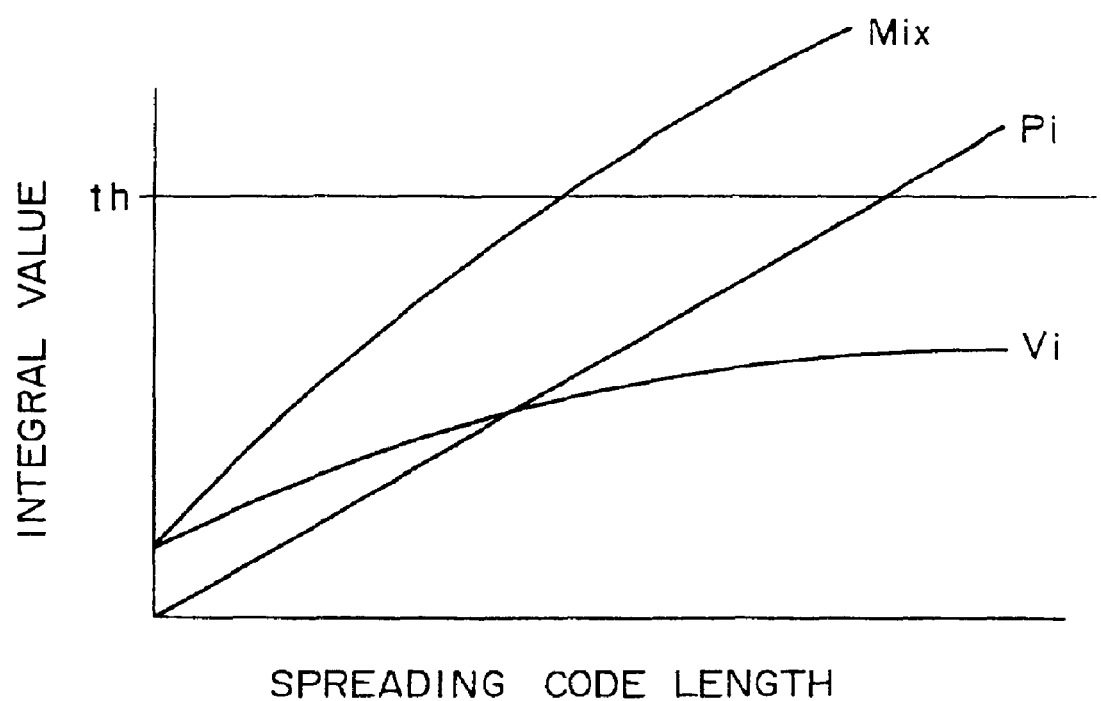
F I G. 11

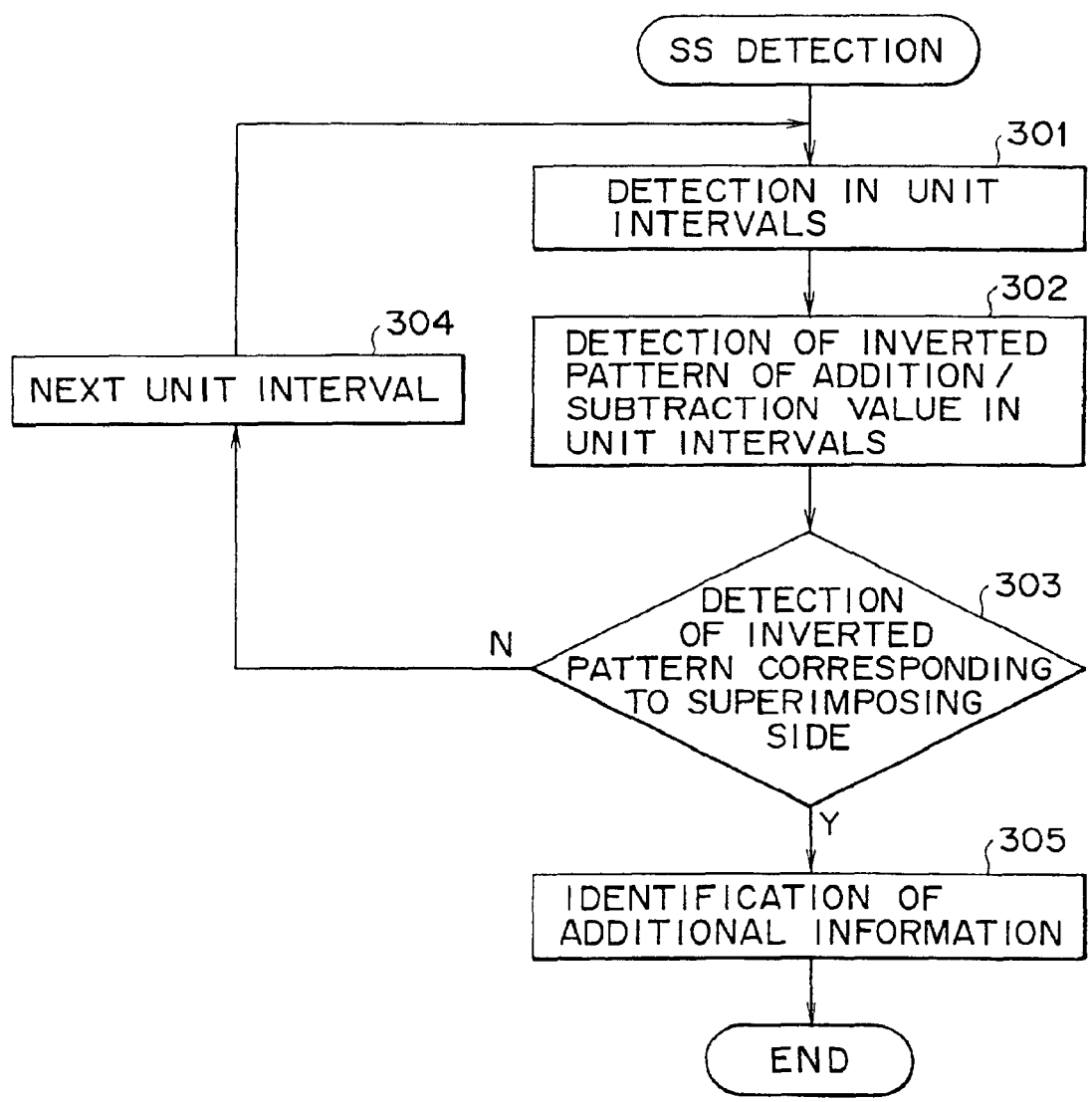
F I G. 12

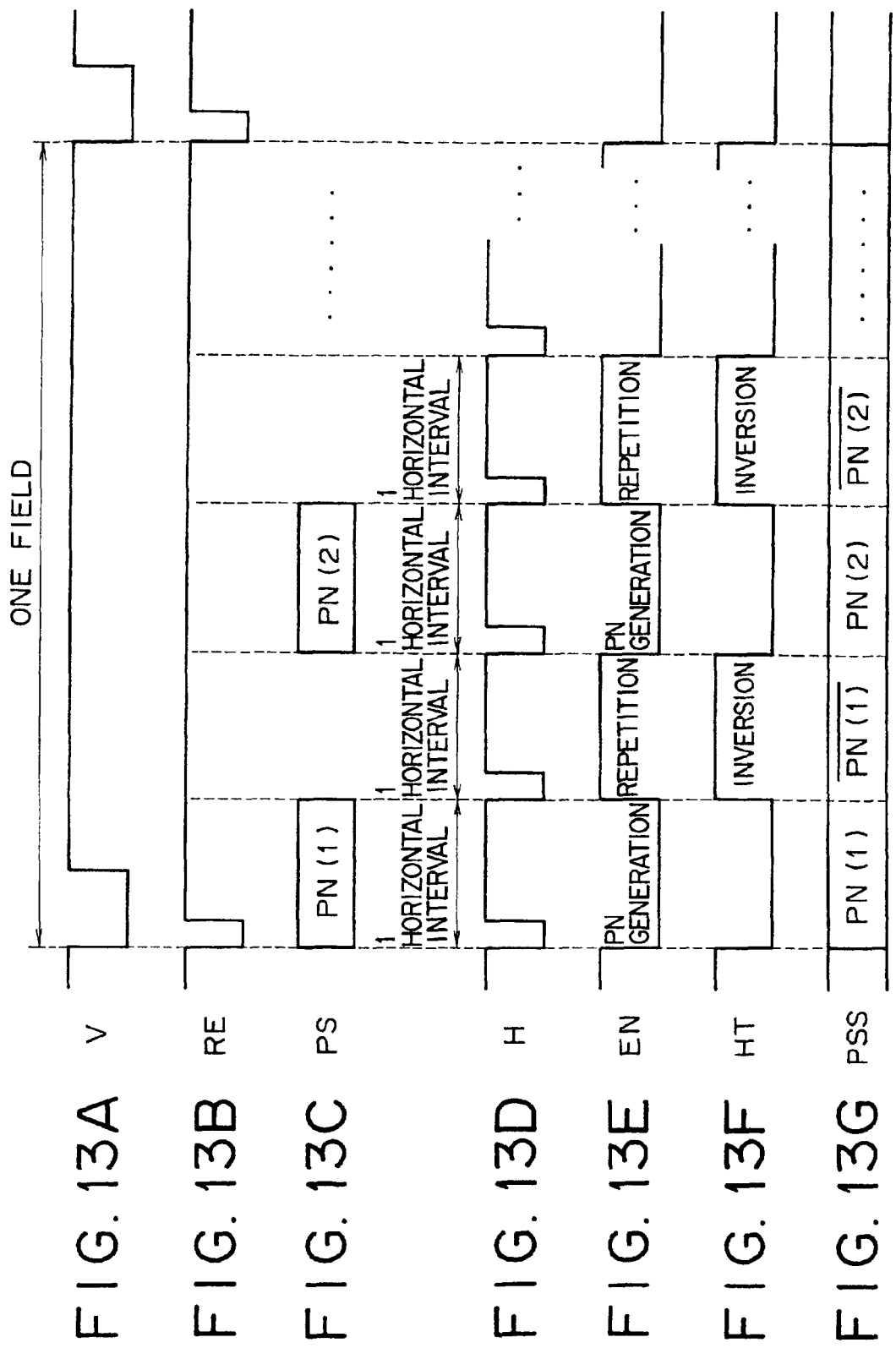

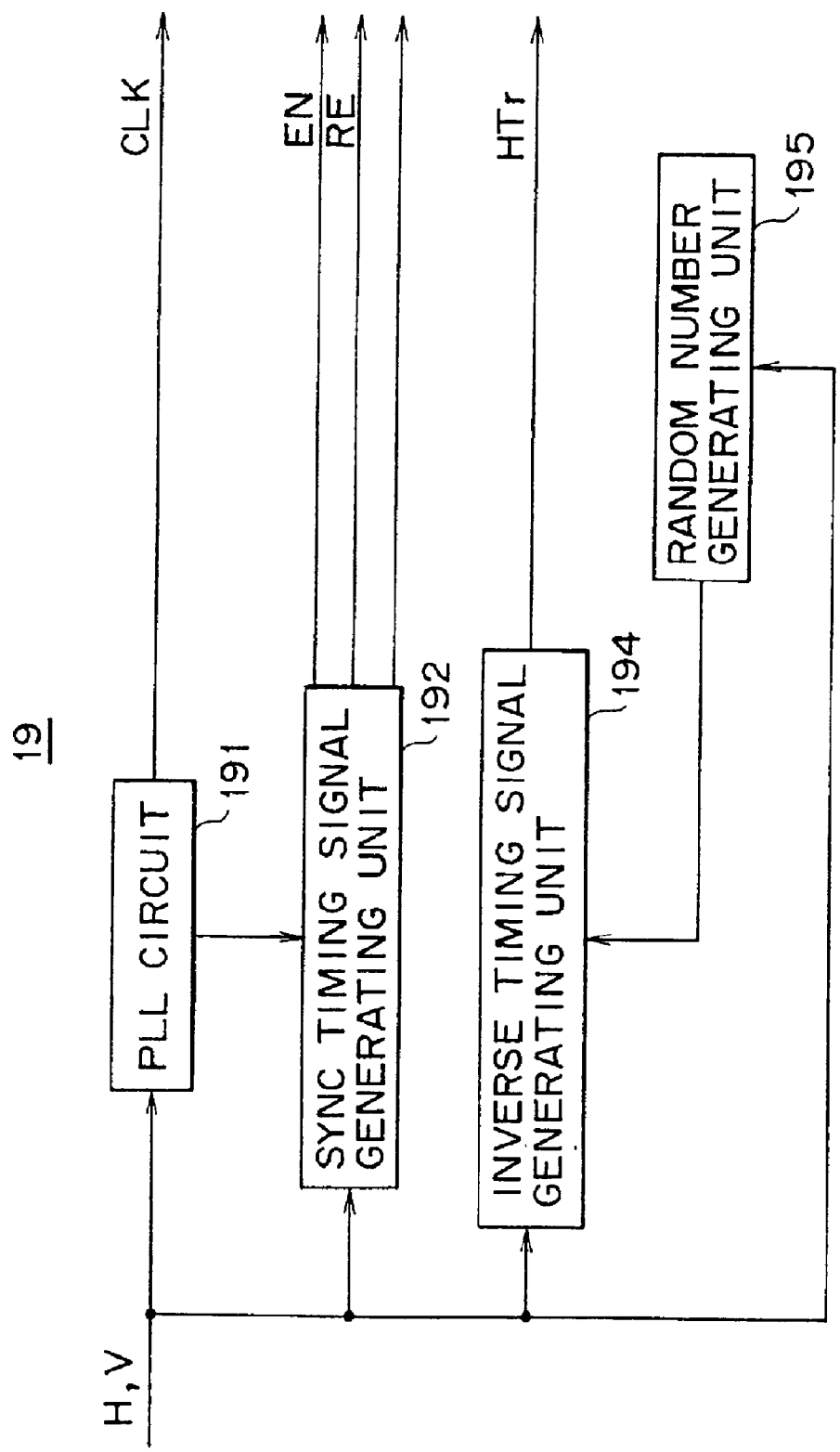

METHOD AND DEVICE OF SUPERIMPOSING AN ADDITIONAL INFORMATION SIGNAL ON A VIDEO SIGNAL AND DETECTING SAID ADDITIONAL INFORMATION FROM SAID VIDEO SIGNAL

This is a division of prior application Ser. No. 09/145,428 on Sep. 1, 1998 now U.S. Pat. No. 6,295,303.

BACKGROUND OF THE INVENTION

1. Field of the Invention

This invention relates to a method, system and device wherein, for example, anti-duplication or other additional information is superimposed on a video signal and transmitted, the additional information superimposed on the video signal is detected on a receiving side, for example by a recorder, and anti-duplication control or other processing is performed.

2. Description of Related Art

Devices for recording digital information, such as digital VTR and MD (mini-disc) record players, are in widespread use, and DVD (digital video disc or digital versatile disk) devices with recording functions have also appeared.

In these digital information recorders, various additional information signals can be recorded together with the main video and audio signals or computer data, etc. In this case, the additional information signal is a digital signal recorded on an area distinct from digital information signal areas, such as for example the headers added to every block of data or TOC (Table of Contents) area.

In the case of a system where additional information is transmitted by superimposing on a conventional main video signal, therefore, the additional information signal is not superimposed directly on digital information signals such as headers, but is recorded on an indirect area.

The additional information signal may therefore easily be eliminated by filtering or tampering, so that necessary additional information signals can no longer be detected by recording and playback devices. In particular, when control information and copyright information are added as additional information signals to prevent illegal duplication, their original purpose cannot be achieved due to the loss of the additional information signal.

Moreover, if the additional information signal is added to an indirect area, only the main information signal will be obtained when the digital information signal is converted to an analog signal and the additional information signal will be lost. Even if an anti-duplication control signal is added as an additional information signal to prevent illegal duplication, this strategy is no longer effective when the signal is converted to an analog signal.

To solve this problem of the disappearance of the additional information signal when the signal is converted to an analog signal, the inventors already proposed a method wherein an additional information signal such as an anti-duplication signal is spectrally spread, and the spectrally spread additional information signal is superimposed on a video signal during digital or analog recording (U.S. patent application Ser. No. 08/75,510).

In this method, spectral spreading is performed by, for example, generating a code of a PN (Pseudorandom Noise) sequence (hereafter, referred to as a PN code) at a sufficiently high rate and applying it to the additional information signal. An additional information signal such as a narrow-band, high level anti-duplication control signal is thereby converted to a wideband, very low level signal which has no effect on the video signal. The additional information signal which has been spectrally spread in this way, i.e. the spectrally spread signal, is then superimposed on an analog video signal and recorded on a recording medium. The video signal recorded on the recording medium may be either analog or digital.

In this method, the additional information signal, such as an anti-duplication control signal, is superimposed with the same timing and frequency as the video signal. It is therefore difficult for a person who wishes to perform illegal duplication to remove the superimposed anti-duplication control signal from the video signal. However, the additional information signal such as a superimposed anti-duplication control signal can still be detected and used by performing despreading.

In this case, the additional information which comprises the spectrally spread signal is not removed from the video signal by detection. Therefore, the additional information must be superimposed on the video signal at a very low level which does not affect the image reproduced from the video signal, but although it is at a very low level, it must be a sufficient level for the additional information to be detected.

The spectrally spread additional information is superimposed on the video signal as a wide-band, low-level signal, and to avoid deterioration of the video signal, it should be superimposed at a low level which is no greater than the S/N ratio of the video signal.

Hence, the spectrally spread additional information is superimposed on the video signal at a low level less than the S/N ratio of the video signal. For example, to enable detection of the additional information of the spectrally spread signal superimposed on the video signal in the recording device, the number of PN codes (PN code length) required to spectrally spread one bit of the additional information must be sufficiently large. The PN code length per bit of this additional information signal may be expressed as a spreading gain (spreading factor) which is a ratio (T/TC) of a time width T per bit of additional information to a time width TC of one PN code (one chip). This spreading gain is determined according to the S/N ratio of the information signal on which it is attempted to superimpose additional information, which in this case is the S/N ratio of the video signal.

For example, when the S/N ratio of the video signal on which the additional information is to be superimposed is 50 dB, the additional information superimposed on the spectrally expanded video signal must be superimposed at a lower level than 50 dB which is the S/N ratio of the video signal. At the same time, to detect the additional information superimposed on the video signal, the S/N ratio must be sufficient for demodulating the additional information after spectral spreading. If this S/N ratio is 10 dB, a spreading gain of 60 dB=(50 dB for S/N ratio of video signal)+(10 dB for S/N required for detection) is required. In this case, the PN code length per bit of additional information becomes one million.

The additional information should be superimposed on the video signal at as high a level as possible, but if the superimposition level of the additional information, which is the spectrally spread signal, is even a little too high, the superimposed additional information will cause visual interference and tend to stand out.

SUMMARY OF THE INVENTION

In view of the aforesaid considerations, it is therefore an object of this invention to resolve all the above problems, to superimpose additional information without deteriorating a video signal, and to permit rapid, accurate detection of the additional information.

This invention is a method of superimposing an additional information signal on a video signal, and detecting the additional information from the video signal on which the additional information is superimposed, wherein:

a first spectral spreading code is generated in predetermined intervals synchronized with a sync signal contained in the video signal, inverting and non-inverting spectral spreading codes are generated by inverting the polarity of the first spectral spreading code in the predetermined interval units, the additional information signal is spectrally spread by the inverting and non-inverting spectral spreading codes to generate a spectrally spread additional information signal, the spectrally spread additional information signal is superimposed on the video signal to generate a video signal with additional information, a second spectral spreading code which is the same as the first spectral spreading code is generated in synchronism with the sync signal contained in the video signal with additional information, values of the video signal with additional information corresponding to chips of the second spectral spreading code are added or subtracted according to the values of the chips of the second spectrally spread signal and the polarity of the predetermined intervals to calculate a cumulative value, the additional information in the video signal with additional information is detected by determining whether the cumulative value exceeded either a positive or negative threshold value.

According to the present invention, the phase (polarity) of the additional information is inverted between a given unit interval and an adjacent unit interval. As in the case of polarity inversion in every field of a color auxiliary carrier wave of a color video signal and polarity inversion in every horizontal scanning interval, the brightness variation of additional information superimposed on a video signal is reversed between adjacent additional information of different polarity, so the variation is averaged out and does not stand out. In other words, visual interference in the reproduced image due to the superimposition of the additional information is suppressed. The additional information may be detected by detecting that the polarity is reversed in the predetermined unit intervals set on the superimposing side. Specifically, even if the additional information bits themselves cannot be detected, the additional information can still be detected by detecting their inversion pattern as a predetermined inversion pattern. Detection is therefore easy even when the superimposing level is very low.

BRIEF DESCRIPTION OF THE DRAWINGS

FIG. 1 is a block diagram describing one form of a video reproducing device as an example of an additional information superimposing device in an additional information superimposing and transmitting method according to this invention.

FIGS. 10A to 10G are diagrams describing the processing of FIG. 9.

FIG. 11 is a diagram describing the detection method of FIG. 8.

FIG. 12 is a flowchart describing another embodiment of the additional information detecting method according to this invention.

FIGS. 13A to 13G are diagrams describing another embodiment of the additional information superimposing and transmitting method according to this invention.

FIG. 14 is a diagram describing yet another embodiment of the additional information superimposing and transmitting method according to this invention.

DETAILED DESCRIPTION OF THE PREFERRED EMBODIMENTS

Figure 2:
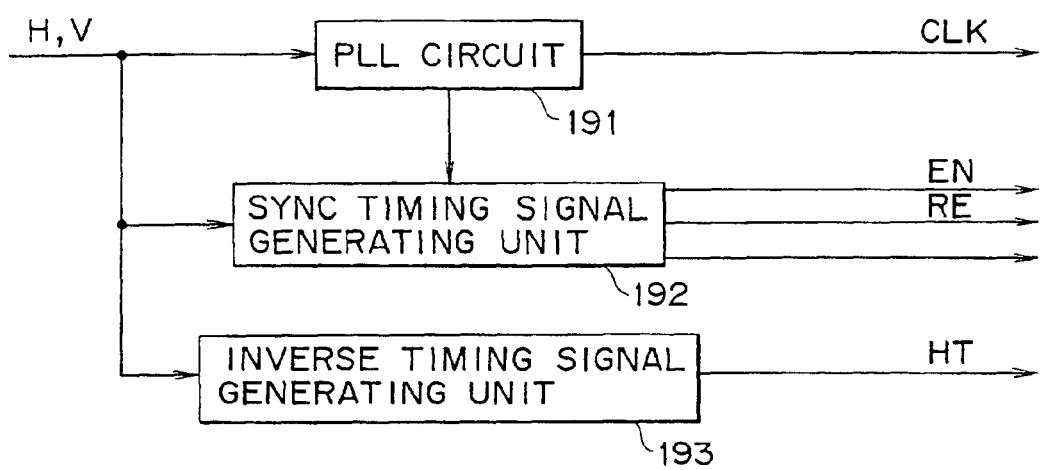
FIG. 2 is a block diagram showing an example of the construction of a timing signal generating unit 19 in FIG. 1.

Some preferred forms of the method and device for superimposing additional information on a video signal according to this invention will now be described with reference to the attached drawings.

In the embodiment described hereafter, the present invention is applied to a system where an analog output video signal from an image output device, such as from a DVD player, is supplied to a DVD recorder for the purpose of copying, and this copying is controlled. An additional information to be superimposed is a duplication control signal.

In this system, in the DVD player, the anti-duplication control information which has been spectrally spread is superimposed on the analog output video signal, output and supplied to the DVD recorder. In the DVD recorder, the spectrally spread anti-duplication control information superimposed on the analog output video signal from the DVD player is detected, and copy control is performed according to the detection output. The method of detecting the spectrally spread signal according to this invention is applied to a spectrally spread signal detecting unit in the DVD player.

First the DVD player, which spectrally spreads and superimposes the anti-duplication control information, will be described.

In the following embodiment, the spectral spreading code is superimposed on the brightness signal Y of the video signals, but is not superimposed on the color signal C. It may of course also be superimposed on the color signal C. However, the color signal of a video signal is transmitted by, for example, two phase axis components such as color difference signals and the color is reproduced by the phases of these two axes. Consequently, if the spectrally spread signal were superimposed on this color signal, there would be a change of hue even if the superimposed signal has a very low level so that the signal is relatively obvious. It is therefore difficult to superimpose the spectrally spread signal without affecting the hue. According to this embodiment, the spectrally spread signal is superimposed only on the brightness signal, however to simplify the description, the term "video signal" will be used without making any distinction between the brightness signal Y and the color signal C.

In FIG. 1, a digitized video signal and audio signal are recorded together with an anti-duplication control signal of a CGMS on a disk 100, which in this example is a DVD. The anti-duplication control signal of the CGMS may be recorded in a track area referred to as a TOC (Table Of Contents) or directory on the innermost or outermost part of the disk 100, or on another recording area inserted in a track on which image data and audio data are recorded.

The following example describes the latter case, wherein the anti-duplication control signal is read simultaneously when the image data is read.

According to this embodiment, the anti-duplication control signal is information for controlling whether to prohibit, permit or permit limited copying of the video signal, and it is inserted in the video data. The disk 100 is loaded in an information output device 10, and recorded signals are read in accordance with read requests.

The DVD player 10 of this example comprises a reading unit 11, decoding unit 12, D/A converter 13, superimposing unit 14, anti-duplication control signal extracting unit 15, SS additional information generating unit 16 (SS is an abbreviation for spectral spreading, same hereafter), D/A converter 17, sync separating unit 18 and timing signal generating unit 19 as shown in FIG. 1.

The reading unit 11 extracts a reproduced video signal component S2 from a signal S1 obtained by reproducing the information recorded on the disk 100, and supplies it to the decoding unit 12 and anti-duplication control signal extracting unit 15.

The decoding unit 12 performs decoding of the reproduced video signal component S2 to form a digital video signal which is supplied to the D/A converter 13.

From the D/A converter 13, an analog video signal S3 comprising a vertical sync signal and a horizontal sync signal is obtained. This analog video signal S3 is supplied to the superimposing unit 14 and to the timing signal generating unit 19.

The anti-duplication control signal extracting unit 15 extracts an anti-duplication control signal S4 from the information data sequence of the reproduced video signal component S2 extracted by the reading unit 11, and supplies it to the SS additional information generating unit 16.

The SS signal generating unit 16 spectrally spreads the anti-duplication control signal S4 from the anti-duplication control signal extraction unit 15 by using a PN code sequence as a spreading code. The signal resulting from spectral spreading in this SS signal generating unit 16, that is, a spectrally spread signal S5, is supplied to the D/A converter 17, and after converting it to an analog signal S6 for superimposing on the analog video signal S3, it is supplied to the superimposing unit 14 and superimposed on the video signal.

The analog video signal S3 from the D/A converter 13 is supplied to the sync separating unit 18, and a vertical sync signal V and horizontal sync signal H are separated from the video signal. This vertical sync signal V and horizontal sync signal H are supplied to the timing signal generating unit 19.

This timing signal generating unit 19 is provided with a PLL circuit 91, sync timing signal generating unit 192, and inverse timing signal generating unit 193 as shown for example in FIG. 2.

The PLL circuit 191 generates a vertical sync signal V (FIG. 4A) and a clock signal CLK synchronized with the timing of the horizontal sync signal. In the case of this example, this clock signal CLK is, for example, a pixel clock synchronized with a pixel sample of the digital video signal S2. It is supplied to the sync timing signal generating unit 192, anti-duplication control signal extraction unit 15 and SS signal generating unit 16, as shown in FIG. 2, The sync timing signal generating unit 192 generates a spreading sync timing signal RE (FIG. 4B) based on a signal synchronized with the timing of the vertical sync signal V and the clock signal CLK. In this example, this spreading sync timing signal RE is a signal with a vertical period. This spreading sync timing signal RE determines the start timing of a spreading code sequence PS (FIG. 4C) which generates the spectrally spread signal S5 as described hereafter. That is, the spreading code sequence PS repeats with a vertical period in synchronism with the vertical sync signal.

The sync timing signal generating unit 192 activates the spreading code generator and generates an ENABLE signal EN for generating spreading codes and other necessary timing signals. These timing signals are supplied to units that require them.

The inverse timing signal generating unit 193 in this example generates an inversion timing signal HT (FIG. 4D) which phase-inverts the spreading code sequence PS in every N (N≧1) intervals where one field is specified as a unit interval.

Various timing signals CLK, EN, and RE which are generated by the timing signal generating unit 19 are supplied to the SS signal generating unit 16.

Figure 3:
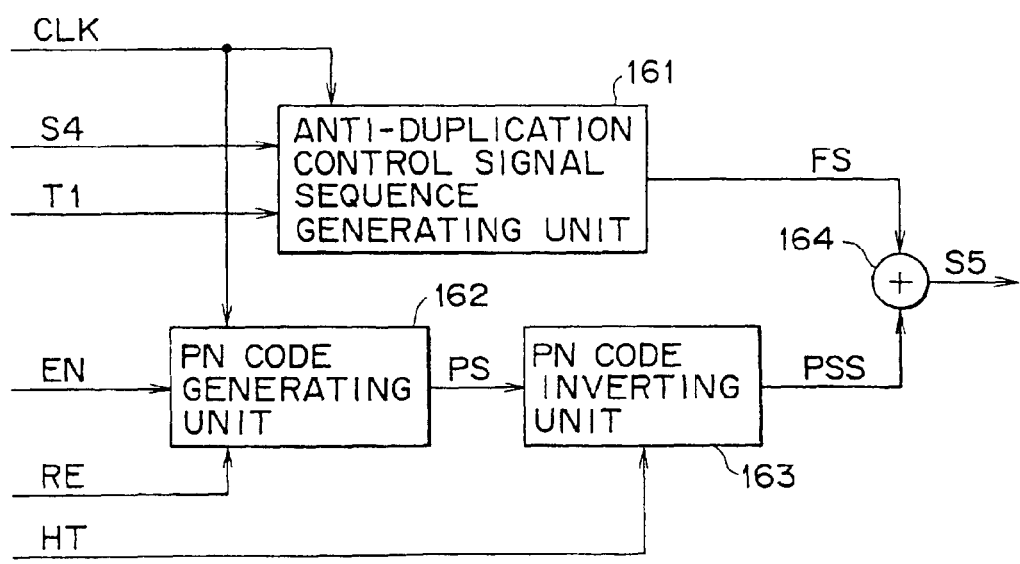
FIG. 3 is a block diagram showing an example of the construction of a SS signal generating unit 16 shown in FIG. 1.

FIG. 3 shows an example of the construction of the SS signal generating unit 16 according to this embodiment. The SS signal generating unit 16 comprises an anti-duplication control signal sequence generating unit 161, PN code generating unit 162, PN code reversing unit 163 and multiplier 164 as shown in FIG. 3.

The clock signal CLK from the timing signal generating unit 19, an anti-duplication control signal S4 and a timing signal T1 from the anti-duplication control signal extraction unit 15 are supplied to the anti-duplication control signal sequence generating unit 161. In this case, the timing signal T1 shows the timing in one bit intervals of the anti-duplication control signal S4. The clock signal CLK is a clock signal synchronized with a reproduced digital signal.

The anti-duplication control signal sequence generating unit 161, by outputting the anti-duplication control signal S4 for a predetermined clock number every bit, generates an anti-duplication control signal sequence FS and supplies it to the multiplier 163. In this case, the anti-duplication control signal sequence FS having one or two low bits prohibiting or permitting duplication is for example generated in intervals of one vertical period.

When the additional information comprises plural bits, e.g. two bits, an interval of one vertical period is divided into this number of bits, and additional information is output from the anti-duplication control signal sequence generating unit 161 one bit at a time in each divided interval. In this case, it is preferable that the division point is a horizontal interval unit. For example, when the additional information comprises two bits, the upper bit is output from the anti-duplication control signal sequence generating unit 161 in plural horizontal intervals in the upper half in the vertical direction of the screen, and the lower bit is output in plural horizontal intervals in the lower half in the vertical direction of the screen.

The clock signal CLK, ENABLE signal EN and spreading sync timing signal RE are supplied to the PN code generating unit 162. The ENABLE signal EN is a signal to activate the PN code generating unit 162. It is generated by the timing signal generating unit 19 and supplied to the PN code generating unit 162 when the power supply to the DVD player is switched on. The spreading sync timing signal RE is a reset signal for this PN code generating unit 162, and it causes a PN code sequence having a predetermined code sequence to be generated from the beginning of the sequence.

Specifically, the PN code generating unit 162 is put into an active state by the ENABLE signal EN. A PN code generating unit 162 generates the PN code sequence from the beginning of the sequence each time the spreading sync timing signal RE is supplied, and generates the PN code sequence PS in synchronism with the clock signal CLK.

Figure 5:
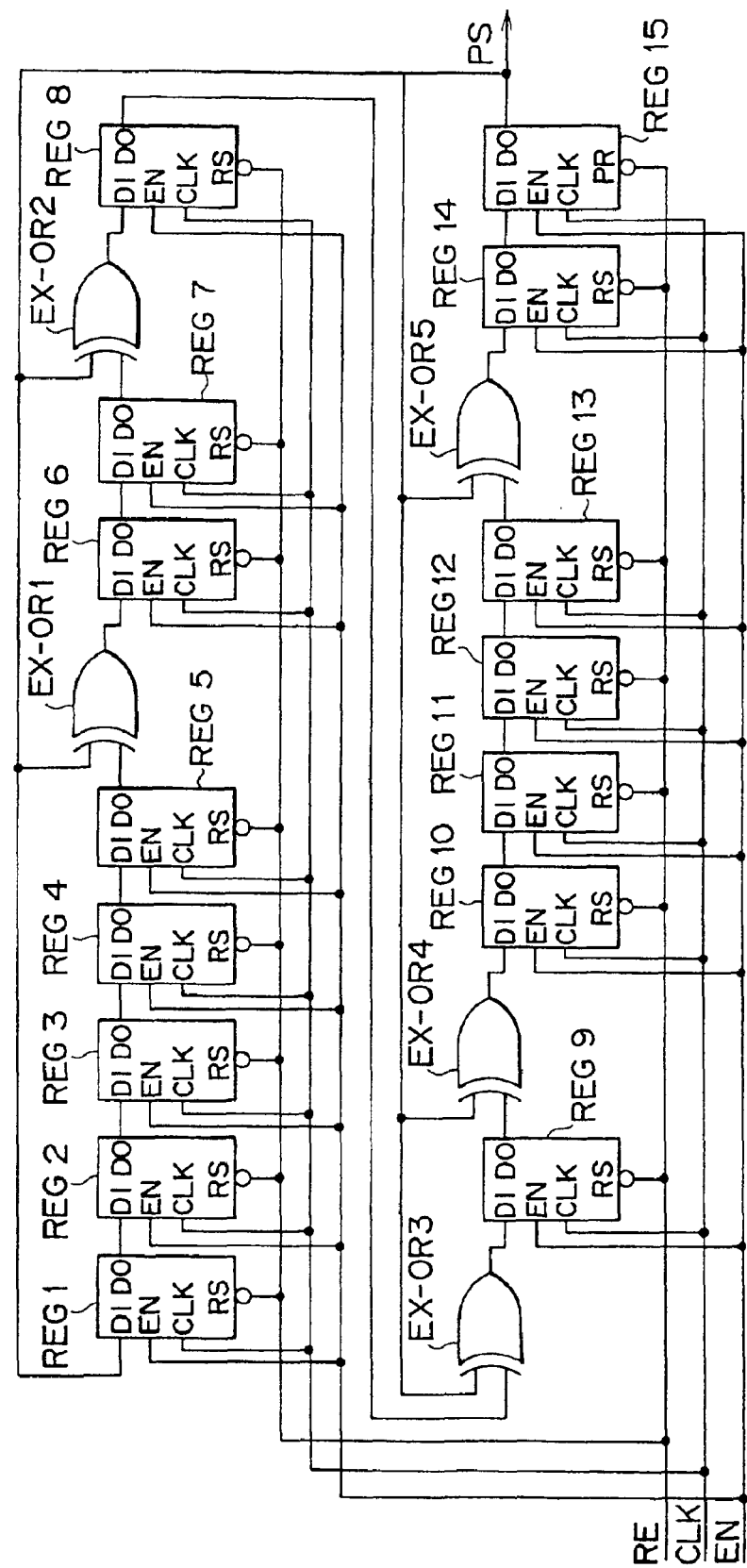
FIG. 5 is a diagram describing an example of a unit 162 of a PN code generating unit in FIG. 3.

FIG. 5 is a diagram showing an example of the construction of the PN code generating unit 162. The PN code generating unit of this example comprises 15 D flip-flops REG1–REG15 which form a 15 stage shift register, and EXCLUSIVE OR circuits EX-OR1-EX-OR5 which compute a suitable tap output of this shift register.

The PN code generating unit 162 generates M PN code sequences PS based on the spreading sync timing signal RE, clock signal CLK and ENABLE signal EN as mentioned above.

The generated PN code sequence PS is supplied to the PN code reversing unit 163. The aforementioned inversion timing signal HT (FIG. 4D) from the timing signal generating unit 19 is supplied to this PN code reversing unit 163. The PN code inverting unit 163 controls whether or not to invert the phase (i.e. replace 0 by 1 and replace 1 by 0) in the PN code sequence PS from the PN code generating unit 162, and forms a PN inverting code sequence PSS.

The inversion timing signal HT is a signal which inverts every vertical interval. In a vertical interval where for example the inversion timing signal HT is high level, the PN code PS is phase-inverted, and in a vertical interval where the inversion timing signal HT is low level, the PN code PS is unchanged. As a result, the PN code sequence PS is converted to a PN code sequence PSS (FIG. 4E) for which the phase is alternately inverted every vertical interval.

This PN inverting code sequence PSS is supplied to the multiplier 164.

The multiplier 164 spectrally spreads the anti-duplication control signal sequence FS using the PN inverting code sequence PSS from the PN code reversing unit 163. A spectrally spread signal S5 which is a spectrally spread anti-duplication control signal is obtained from this multiplier 164.

The spectrally spread signal S5 thus obtained from the SS signal generating unit 16 is supplied to a D/A converter 17 which converts it to an analog SS signal S6 and supplies it to the superimposing unit 14. In the case of this example, when the value of the chip of spectrally spread signal S5 is "0", the D/A converter 17 sets the analog SS signal to a predetermined positive, very low level, and when the value is "1", it sets the analog SS signal to a predetermined negative, very low level.

The superimposing unit 14 receives the analog video signal S3 from the D/A converter 13 and the analog SS signal S6 from the D/A converter 17, forms an analog video signal S7 on which the analog SS signal S6 is superimposed, and outputs this. The analog video signal S7 on which this analog SS signal S6 is superimposed is supplied to a monitor receiver which displays an image, or a recorder which records the video signal on a recording medium.

Figure 6A:
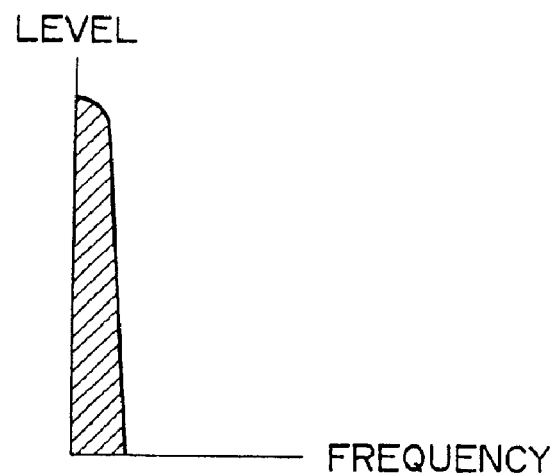
FIGS. 6A to 6D are frequency spectrum diagrams describing a relation between a video signal and additional information in one embodiment of the additional information superimposing method according to this invention.
Figure 6B:
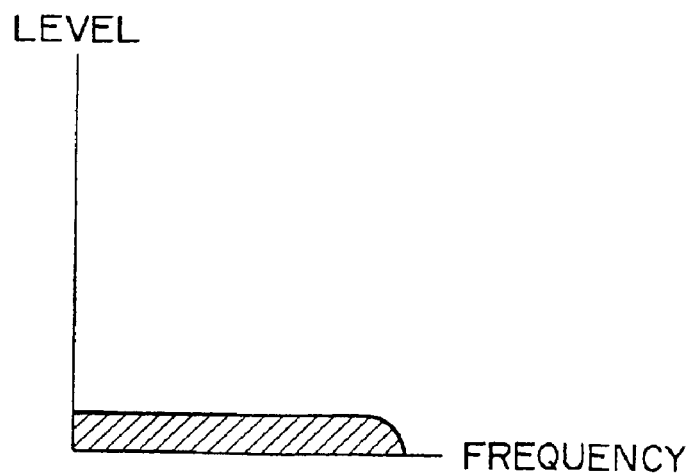

FIGS. 6A and 6B shows the relation between the spectrally spread signal and the video signal. The additional information signal which is spectrally spread is a signal containing a small amount of information with a low bit rate, and it is a narrow-band signal as shown in FIG. 6A. When spectral spreading is applied to this, it becomes a wide-band signal as shown in FIG. 6B.

The spectrally spread signal level decreases in inverse proportion to the spreading factor of the band.

Figure 6C:
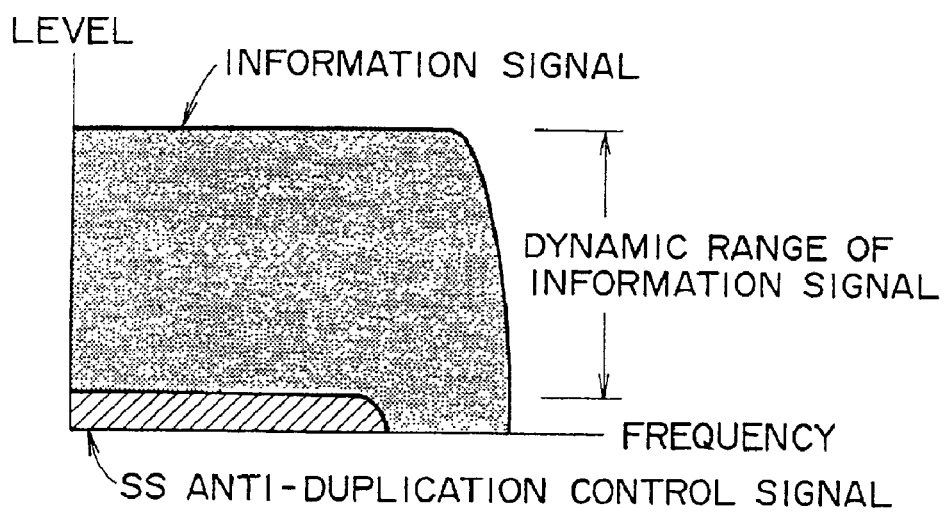

This spectrally spread signal is superimposed by the superimposing unit 14 on the video signal. In this case, the spectrally spread signal is superimposed at a lower level than the dynamic range of the information signal, e.g. a video signal, as shown in FIG. 6C. By superimposing the signal in this way, there is practically no deterioration of the information signal, e.g. video signal. When the video signal on which the spectrally spread signal is superimposed is supplied to a monitor receiver, the effect of the spectrally spread signal is almost nil when the image is reproduced, and a good reproduced image is obtained.

Figure 6D:
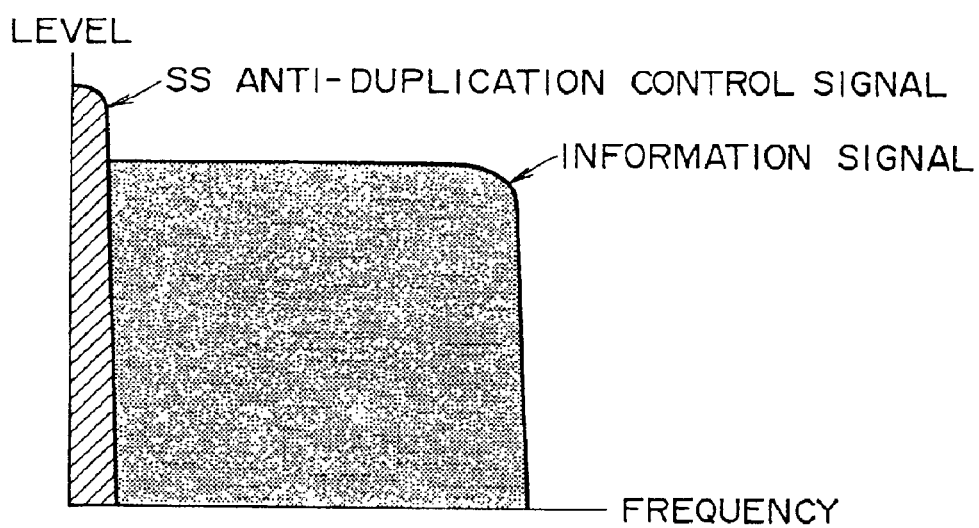

When spectral despreading is performed to detect the superimposed spectrally spread signal as described hereafter, the spectrally spread signal is again restored as a narrow-band signal, as shown in FIG. 6D. By providing a sufficient bandwidth spreading factor, the power of the additional information signal after despreading exceeds the information signal, and it can then be detected.

In this case, the additional information signal superimposed on the video or information signal, is superimposed with the same timing and frequency as that of the video or information signal, so it cannot be deleted or modified by using a frequency filter or simple information replacement.

By superimposing and recording a required additional information signal on the video signal and recording it so that it becomes attached to the video signal, the additional information signal such as the aforesaid anti-duplication control signal can be transmitted without fail. Moreover, when the spectrally spread additional information signal is superimposed on the information signal at a lower signal power than that of the information signal, deterioration of the information signal can be minimized.

Therefore, when for example an anti-duplication control signal is superimposed as additional information on a video signal, tampering or removal of the anti-duplication signal is difficult as described hereabove, so illegal duplication can definitively be prevented.

Moreover, in the aforesaid construction, spectral spreading was performed using a PN code sequence having a vertical period based on the vertical sync signal, so the PN code sequence for spectral despreading required to detect this spectrally spread signal from the video signal can easily be generated based on a signal synchronized with the vertical sync signal detected from the video signal. That is, sync control of the despreading PN code using, for example, a sliding correlation is unnecessary. As the despreading PN code sequence can easily be generated in this way, spectral despreading can be rapidly performed, and an additional information signal such as an anti-duplication control signal which is superimposed on the video signal detected.

Further, according to the first embodiment, a spectrally spread signal having the same additional information content is phase-inverted and superimposed in adjacent vertical intervals (adjacent fields). Therefore, the superimposed additional information component becomes less conspicuous due to a visual integration effect, so the superimposing level of the additional information can be increased.

In other words, by taking the correlation interval of the video signal to be the periodic interval of the spreading code and taking it to be a unit interval, since the superimposed additional information component is phase-inverted in adjacent unit intervals, it becomes less conspicuous due to a visual integration effect, and the superimposing level of the additional information can be increased.

Next, the additional information detecting device in the first embodiment of the additional information superimposing and transmitting method, will be described in the case where an analog video signal S7 on which a spectrally spread signal has been superimposed, is received from the aforesaid DVD player, and applied to a DVD device which records the image information.

Figure 7:
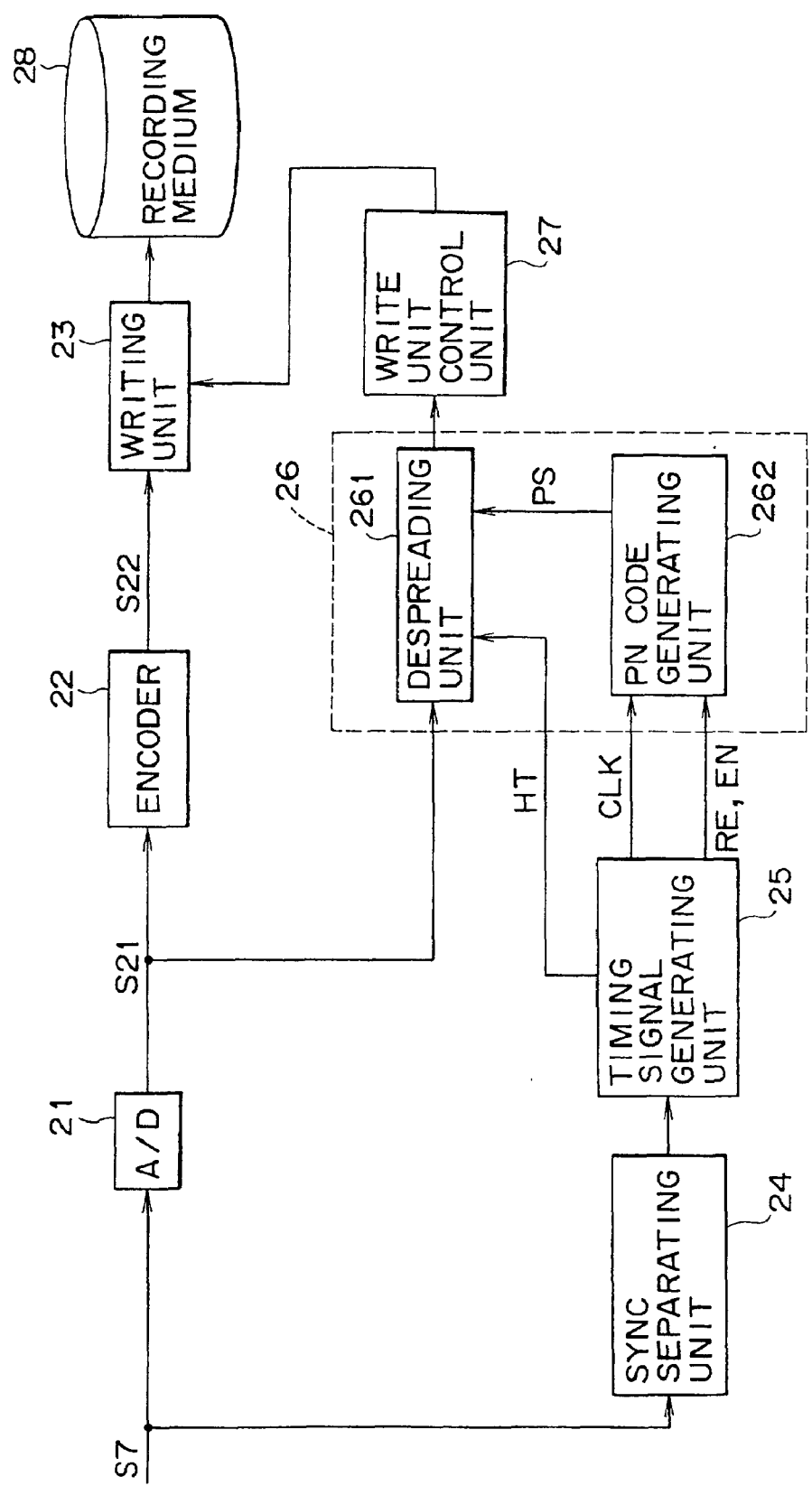
FIG. 7 is a block diagram showing one embodiment of an additional information detection device according to this invention.

FIG. 7 shows an example of the construction of the DVD device in this embodiment. The device comprises an A/D converter 21, encoder 22, writing unit 23, sync separating unit 24, timing signal generating unit 25, SS signal detecting unit 26, and writing unit controller 27 which controls permission/prohibition of duplication by the writing unit 23. In this case, the recording medium 28 is a DVD on which the video signal is written.

The analog video signal S7 from the DVD player is converted by the A/D conversion circuit 21, and supplied as a digital video signal S21 to the encoder 22. The encoder 22 receives the supplied digital video signal S21, and performs encoding processing such as removing the sync signal from the video signal and data compressing the digital video signal etc., so as to form a digital video signal S22, and this is supplied to the writing unit 23.

When duplication is permitted under the control of the writing unit controller 27, the writing unit 23 writes the digital video signal from the encoder 22 on the recording medium 28, and when duplication is not permitted, the writing unit 23 does not write the digital video signal on the recording medium 28.

The spectrally spread signal, which is the additional information superimposed on the video signal, is detected as follows.

The input analog video signal S7 is supplied to the sync separating unit 24 where the vertical sync signal V and horizontal sync signal H are separated and extracted. The separated vertical sync signal V and horizontal sync signal H are supplied to the timing signal generating unit 25. This timing signal generating unit 25 has an identical construction to the timing signal generating unit 19 shown in FIG. 2, and it generates a clock signal CLK, PN code spreading sync timing signal RE and ENABLE signal EN based on the vertical sync signal V and horizontal sync signal H. This clock signal CLK, ENABLE signal EN, and spreading sync timing signal RE are sent to the SS signal detecting unit 26.

The SS signal detecting unit 26 comprises a despreading unit 261 and PN code generating unit 262. The PN code generating unit 262 has an identical construction to the PN code generating unit 162 shown in FIG. 5 which forms part of the SS signal generating unit 16 of FIG. 3. On receiving the clock signal CLK from the timing signal generating unit 25, ENABLE signal EN and spreading sync timing signal RE, a PN code sequence PS is generated. If jitter of the video sync signal is disregarded, the PN code sequence PS from this PN code generating unit 262 is the same PN code which is completely synchronized with the PN code sequence PS from the PN code generating unit 162 of the aforesaid DVD player. In the SS signal detecting unit 26, the PN code sequence PS is supplied as it is to the despreading unit 261 without inverting.

The despreading unit 261 detects the spectrally spread signal by finding the correlation between the PN code sequence PS generated by the PN code generating unit 262 and the digital video signal S21 on which the spectrally spread signal from the A/D converter 21 is superimposed. In this case, the inversion timing signal HT from the timing signal generating unit 25 is supplied to the despreading unit 261, and detection is performed taking account of the intervals of the spectrally spread signal which are phase-inverted. The following two embodiments describe how the intervals of the phase-inverted spectrally spread signal are treated to detect it.

In the first embodiment, the spectrally spread signal is not detected in one period of the PN code, but over intervals which are several times the PN code period and which comprise one inverting interval.

Figure 8:
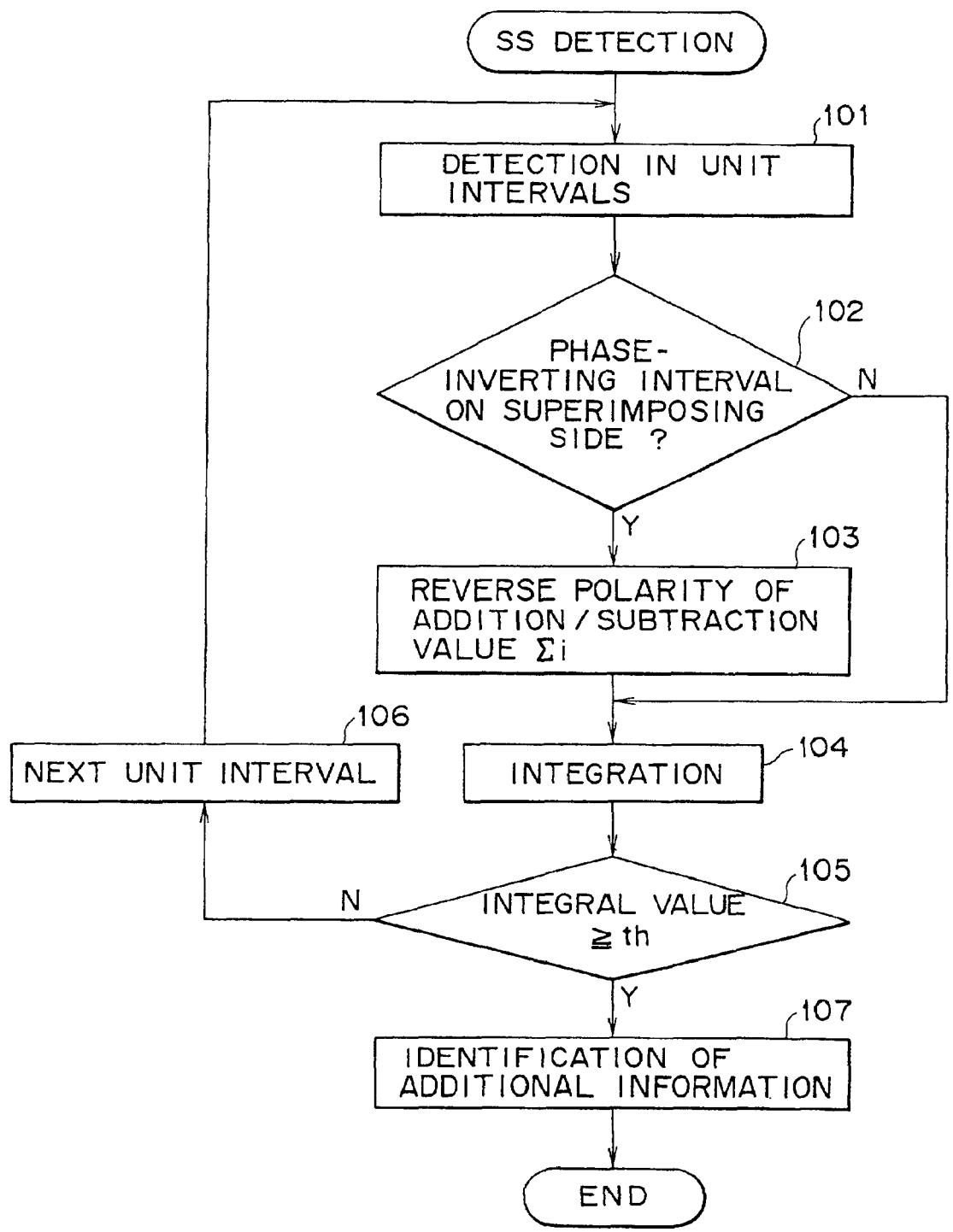
FIG. 8 is a flowchart describing one embodiment of an additional information detecting method according to this invention.

FIG. 8 is a flowchart showing the flow of the first embodiment of the process whereby the spectrally spread signal is detected by the despreading unit 261.

In this case, the spectrally spread signal is detected in unit intervals (step 101). That is, detection is performed every period of the PN code sequence PS, which is the spreading code, taking one vertical interval as the unit interval.

Figure 9:
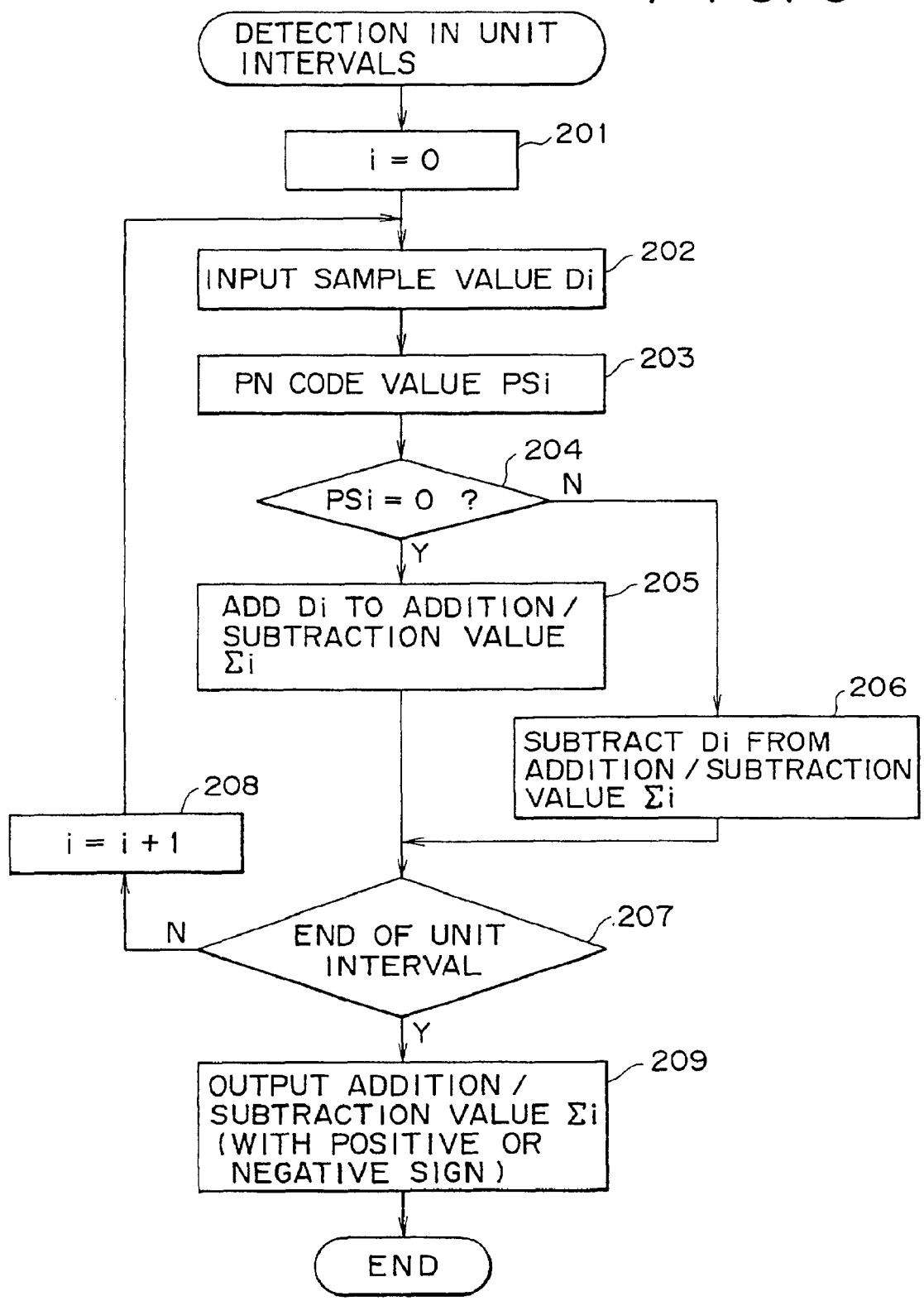
FIG. 9 is a flowchart showing a detailed example of the processing of some of the steps in FIG. 8.

This detection every unit interval in the step 101 will now be described referring to FIG. 9 and FIG. 10. FIG. 9 is a flowchart showing the flow of the detection process every unit interval.

First, initialization is performed in a step 201. Next, in a step S202, the pixel value of the digital video signal S21 from the A/D converter 21 is acquired as an input sample value Di. Next, in a step 203, a code value PSi of the PN code sequence corresponding to the pixel concerned is acquired. In the next step 204, it is determined whether the PN code value PSi is "0" or "1".

If the PN code value PSi is "0", the input sample value Di is added in a step 205 to an addition/subtraction value Σi obtained so far, otherwise if the PN code value Si is "1", the input sample value Di is subtracted in a step 206 from the addition/subtraction value Σi obtained so far.

After the step 205 or step 206, the routine proceeds to a step 207, and it is determined whether or not the aforesaid addition/subtraction processing has been additional information bit is "0" as shown in FIG. 10A, when the PN code sequence PS is not phase-inverted, the spectrally spread signal S5 is also "0110 . . . " as shown on the left-hand side of FIG. 10B. On the other hand, when the PN code sequence PS is phase-inverted, the spectrally spread signal S5 is inverted to "1001 . . . " as shown on the right-hand side of FIG. 10B.

In the analog converted signal S6 of the spectrally spread signal S5, as was described hereabove, the value of the spectrally spread signal is arranged to be a positive level at "0" and a negative level at "1", and is superimposed on an analog video signal (luminance signal). Therefore, if the very low level of the superimposed spectrally spread signal component is, for simplicity, a digital value of 1 (decimal number), the result is as shown in FIG. 10F. The very low superimposing level is not limited to 1 in decimal numbers, and may be of the order of 2–10.

On the other hand, the phase is not inverted for the PN code sequence PS from the PN code generating unit 262 of the SS signal detecting unit 26 on the additional information detecting side as shown in FIG. 10C. The video component in the digital signal S21 from the A/D converter 21 has little or no correlation with the PN code sequence PS, and from the computation of the aforesaid steps 102–105, performed for all the pixels in a unit interval. If processing of all pixels in a unit interval has not been completed, the routine proceeds to a step 208, returns to the step 201 with i=i+1, the correlation of the next input sample value Di with the PN code value PSi is computed as described hereabove, and the result is integrated with the addition/subtraction value $\Sigma i$.

In a step 207, when it is determined that processing of all pixels in a unit interval has ended, the addition/subtraction value $\Sigma i$ at that time is returned.

When the addition/subtraction value $\Sigma i$ of a unit interval is obtained as mentioned above in the step 101, in the following step 102, it is determined whether this unit interval is an inverting interval or a non-inverting interval. When it is an inverting interval the routine proceeds to a step 103, the polarity of the addition/subtraction value is inverted, and in the next step 104, integrated with the integral value of the addition/subtraction value $\Sigma i$ every unit interval up to the preceding interval. On the other hand, in the step 102, when it is determined that this interval is a non-inverting interval, the result is integrated in the step 104 with the addition/subtraction value every unit interval up to the preceding interval with the current polarity.

In the next step 105, it is determined whether the integral value exceeded a predetermined threshold value th. If the integral value does not exceed the threshold value th, the routine proceeds to a step 106, detection moves to the following unit interval, the routine returns to the step 101, the aforesaid processing is repeated, the addition/subtraction value $\Sigma i$ for the next unit interval is computed, and the result is integrated with the integral value as described hereabove. When it is determined in the step 105 that the addition/subtraction value $\Sigma i$ has exceeded the threshold value th, it is assumed that spectrally spread signal was detected, the routine proceeds to a step 107, a data determination is performed, i.e. it is determined whether the spectrally spread additional information bit is "0" or "1", and this is output. It should be noted that when the detection result for the first vertical interval, i.e. the addition/subtraction value $\Sigma i$ for only the first vertical interval, exceeds the threshold value th, the additional information is identified at that time.

The method of detecting this spectrally spread signal will be described referring to FIG. 10 and FIG. 11.

When the PN code sequence PS of the PN code generating unit 16 during superimposition is "0110 . . . " and the the correlation with the video component in the addition/subtraction value $\Sigma i$ is not linearly proportional, but increases in proportion to the square root as shown by the curve Vi in FIG. 11.

As the phase of the video signal is not inverted each unit interval, the addition/subtraction value $\Sigma i$ of the PN code PS (FIG. 10C) on the detecting side which is not phase-inverted is the same in non-inverting unit intervals and phase-inverting unit intervals. For example, if the digital level (FIG. 10D) of the video component (decimal) is as shown in FIG. 10D, from the computation of the aforesaid steps 203–206, the addition/subtraction value $\Sigma i$ for this video component will be as shown in FIG. 10E.

On the other hand, regarding the spectrally spread signal component (FIG. 10F) in the digital signal S21, as shown in FIG. 10G, the addition/subtraction value $\Sigma i$ gradually increases in a positive direction in non-inverting intervals and gradually increases in a negative direction in inverting intervals. This is for the case where the additional information bit is "0". When the additional information bit is "1", the left-right relation in FIG. 10G is reversed, so the addition/subtraction value $\Sigma i$ gradually increases in a positive direction in inverting intervals and gradually increases in a negative direction in an non-inverting intervals.

As shown in FIG. 10G, if the value of the additional information bit is the same, the addition/subtraction value $\Sigma i$ in inverting intervals has reversed polarity to the addition/subtraction value $\Sigma i$ in non-inverting intervals. Therefore, if the addition/subtraction value $\Sigma i$ in inverting intervals is integrated with reverse polarity, it is the same as if the integration were performed with the same polarity, and the integral value increases as shown by the curve Pi in FIG. 11.

On the other hand for the video signal component, the addition/subtraction value is the same for inverting intervals or non-inverting intervals as shown in FIG. 10E, and if the integration is performed with reverse polarity, as spreading is performed by the same PN code sequence PS in each vertical interval, the video signal component becomes zero. In practice, as inverting unit intervals and non-inverting unit intervals are different intervals, the video signal components are not exactly the same and will almost never be zero. However in the case of the aforesaid embodiment, the unit interval is a vertical interval, and the video signals in adjacent vertical intervals, i.e. adjacent fields, have a strong correlation, so they can be regarded as being effectively the same.

Therefore, by inverting and integrating the addition/subtraction value $\Sigma i$ for each unit interval, the correlation between the video signal and the PN code of a vertical interval which is the immediately preceding unit interval is effectively canceled out, so the correlation of the video signal and PN code sequence PS is even less than the curve Vi of FIG. 11. That is, the correlation of the video signal and PN code sequence in the integral value is canceled out by the correlation between video signals in unit intervals.

As the addition/subtraction value $\Sigma i$ of the additional information bit increases as shown by the curve Pi in FIG. 11, the combined value of the video component and the addition/subtraction value varies as shown by the curve Mix in FIG. 11. A predetermined threshold value th is therefore preset, and if the addition/subtraction value $\Sigma i$ exceeded this threshold value th, it means that spectrally spread additional information was detected.

In the case of this embodiment, a positive threshold value th is set for detecting an additional information bit which is "0", and a negative, threshold value th is set for detecting an additional information bit which is "1". When an additional information bit "0" a is detected, it is detected that the phase of the PN code sequence which is the spectrally spread signal was not inverted. Conversely, when an additional information bit "1" is detected, it is detected that the phase of the PN code sequence which is the spectrally spread signal was inverted.

In the flowchart of FIG. 8, the comparison of the integral value with the threshold value th in the step 105 is a comparison with the aforesaid positive threshold value and negative threshold value. The identification of the additional information in the step 107 is a determination as to whether the additional information bit is "0" or "1" by determining which threshold value has been exceeded.

The writing unit control unit 27 controls the writing unit 23 according to the anti-duplication control signal data detected in this way. That is, when the instructions of the detected anti-duplication control signal are to prohibit duplication, the writing unit control unit 27 controls the writing unit 23 so that a digital video signal is not written on the recording medium 28.

When plural bits of additional information are superimposed in one vertical interval, the additional information bits are detected in the same way. In this case, when the upper bit is spectrally spread in the upper half and the lower bit is spectrally spread in the lower half of one vertical interval, detection is easier if the spectrally spread signal is detected in separate superimposing intervals for the upper bit and lower bit.

FIG. 12 is a flowchart showing the steps of the second embodiment of spectrally spread signal detection by the despreading unit 261.

According also to this second embodiment, detection of the spectrally spread signal is performed in unit intervals (step 301). According to this embodiment, one vertical interval is taken to be the unit interval as described above, so detection is performed every vertical interval. The detection processing of each unit interval in the step 301 is the same as the aforesaid description using FIG. 9 and FIG. 10.

In the next step 302, by detecting the polarity of the addition/subtraction value $\Sigma i$ in each unit interval of plural unit intervals, it is detected whether or not a pattern with reversed polarity is the same as an inverted pattern of the PN code sequence on the side where the spectrally spread signal is superimposed. According to this second embodiment, in order to identify plural fields which are the aforesaid plural unit intervals, a time code in at least field units is for example spectrally spread and superimposed on the video signal, and the aforesaid plural unit intervals are identified based on this time code.

The timing signal for identifying plural field intervals which are these plural unit intervals is not limited to a spectrally spread time code, and various other methods may be employed such as for example using a digital video signal field ID or frame ID, or superimposing a time code which indicates the start or end of these plural unit intervals in a predetermined horizontal interval of a vertical blanking period of the analog video signal.

In the case of this embodiment, as the phase of the PN code sequence PS is inverted every vertical interval, when the additional information bit is "0", the polarity of the addition/subtraction value will be alternately "positive", "negative", "positive", "negative" from one vertical interval at the start of the specified plural vertical intervals. Conversely, when the additional information bit is "1", the polarity of the addition/subtraction value will be alternately "negative", "positive", "negative", "positive" from one vertical interval at the start of the specified plural vertical intervals. Hence the spectrally spread additional information can be detected by detecting this inverted pattern.

Therefore, after the step 302, the routine proceeds to a step 303, and it is determined whether or not an inverted pattern corresponding to the inverted pattern on the side where the additional information is superimposed, was detected. When the inverted pattern was not detected, the routine proceeds to a step 304, detection moves to the next unit interval, the routine returns to the step 301, and the aforesaid processing is repeated.

When an inverted pattern corresponding to the inverted pattern on the side where additional information is superimposed was detected in the step 303, the routine proceeds to a step 305, and the additional information bit corresponding to this pattern is identified.

When plural bits of additional information are superimposed in one vertical interval, the additional information bits are detected in the same way. In this case, when the upper bit is spectrally spread in the upper half and the lower bit is spectrally spread in the lower half of one vertical interval, detection is easier if the spectrally spread signal is detected in separate superimposing intervals for the upper bit and lower bit.

The above-mentioned embodiments 1 and 2 of method of detecting spectrally spread signal have common modifications.

The same result is achieved if, instead of inverting the PN code sequence every unit interval as an example of the spreading code, the additional information bits are inverted.

The chip period of the spreading code is not necessarily a pixel period, but may be a plural pixel period. For example, spectral spreading can be performed by assigning one chip of a spreading code to a block unit of vertical×horizontal=8 pixels (lines), which is a unit for compressing a digital video signal.

Phase inversion may be performed not alternately every vertical period, but every plural unit intervals. Also, one unit interval in plural unit intervals may be taken as an inverting interval, or any number of unit intervals in plural intervals may be taken as an inverting interval.

The reset period of the spreading code is not necessarily one vertical period, but may be plural vertical periods. Also, taking the reset period of the spreading code as one horizontal period or plural horizontal periods, the inverting unit interval may be taken as one pixel or plural pixel intervals.

Also, in the processing of the flowchart of FIG. 8 or FIG. 12, despreading of one or more bits of additional information can be performed by detecting whether or not the spectrally spread signal is superimposed and detecting the PN code sequence, and multiplying the detected PN code sequence by the digital signal S21 from the A/D converter 21.

Moreover, in the aforesaid description, the case has been described where the addition/subtraction of a digital value was performed when computing the addition/subtraction value to detect the spectrally spread signal. However, the addition/subtraction may be performed also by providing a charging/discharging condenser for the analog signal S7 before A/D conversion, and charging/discharging the condenser according to the chip values of the PN code sequence.

Moreover, in the above example, the superimposing level was set to positive and negative according to whether the chip of the spreading code was "0" or "1", but it is also possible to set one of these options to zero, and the other one to either positive or negative. In this case too, the invention may be applied.

Also, in the first embodiment, different spreading code sequences may be used for each unit interval of the plural unit intervals (one period or plural periods of the spreading code).

In the aforesaid first embodiment, phase inversion of the spectrally spread signal was performed in one or plural periods of the spreading code as a unit interval. In this second embodiment, in the first period of the spreading code, phase inversion of the spectrally spread signal is performed with 1/N (N$\geq$1) periods of this spreading code as unit interval. It will however be assumed that this unit interval is an interval where there is a correlation with the video signal.

According to this second embodiment, the block construction of the device on the additional information superimposing side and additional information detecting side is substantially identical to that of the first embodiment. In this second embodiment, however, the spectral spreading code sequence in inverted unit intervals is such that the spreading code sequence in the immediately preceding unit interval is continually repeated.

FIGS. 13A to 13G show a timing chart for the purpose of describing one example of this second embodiment. In the example of FIGS. 13A to 13G, the spreading code is a PN code, and the PN code sequence PS (FIG. 13C) is generated using a signal RE (FIG. 13B) of a vertical period synchronized with the vertical sync signal (FIG. 13A) of the video signal as a spreading sync timing signal (reset signal) as described hereabove. Further, the unit interval in the case of this second embodiment is taken to be one horizontal interval.

In this second embodiment, as shown in FIG. 13F, the inverse timing signal HT is alternately set to high level and low level in each horizontal interval, which is the unit interval, in synchronism with the horizontal sync signal H (FIG. 13D, and the spreading code PS in a vertical interval is alternately inverted every horizontal interval so as to generate the PN inverting code sequence PSS (FIG. 13G).

Also in this example, an ENABLE signal EN (FIG. 13E) is generated in synchronism with the inverse timing signal HT, and the PN code generating unit is controlled by this ENABLE signal EN. That is, the PN code sequence is generated only during a low level interval of this ENABLE signal EN (non-inverting interval). During an interval when the ENABLE signal EN is high level, the PN code sequence of the immediately preceding unit interval is repeated so as to obtain the spreading code sequence PS (FIG. 13C).

Figure 4:
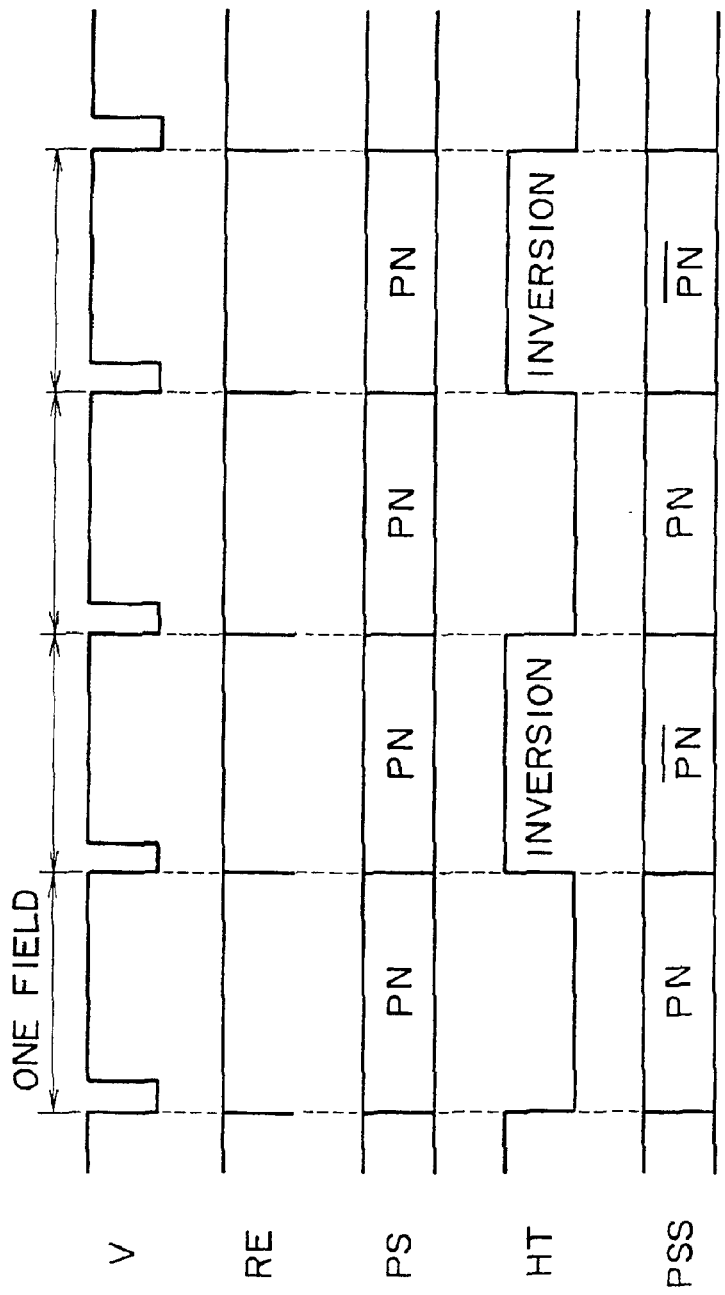
FIGS. 4A to 4E are diagrams describing one embodiment of an additional information superposing method according to this invention.

In FIG. 4C, the symbols PN(1), PN(2), PN(3) with numbers in parentheses are used for convenience as the PN code sequence PS is reversed in every horizontal interval as described hereafter. In practice, the PN code sequence PS is not divided into the horizontal intervals shown in FIG. 4C, and is a continuous code sequence in one vertical interval. Also, when the same number appears in parentheses, e.g. PN(1), PN(1), PN(2), PN(2), it means that the same code sequence is repeated.

In this way, the PN code sequence PSS (FIG. 13G) is generated where two horizontal intervals have the same code sequence and inverted phase. The additional information is spectrally spread by this PN inverting code sequence PSS, and superimposed on the video signal.

The detection of the spectrally spread signal superimposed on the video signal in this way is performed only when the unit interval is equal to 1/N periods of the PN code. Detection is then performed in the same way as in the above case by an additional information detection algorithm shown in FIG. 8 or FIG. 12.

In the case of the algorithm in FIG. 8, due to the vertical correlation of the video signal, video signal components cancel each other out when the additional information is detected in two repeated horizontal intervals, so the additional information can be detected with higher precision, and the amount of superimposition of additional information per detection can be lowered.

Further, according to this second embodiment, spectrally spread signals with the same additional information content are phase-inverted and superimposed in adjacent horizontal intervals. Therefore, due to a visual integration effect, the superimposed additional information component becomes less conspicuous, and the additional information superimposing level can be raised.

Inversion in every unit interval of the spectrally spread signal may be performed not by reversing the spreading code, e.g. the PN code sequence, but also by inverting the additional information bit.

The chip period of the spreading code is not necessarily a pixel period, but may be plural pixel periods. For example, spectral spreading can be performed by assigning one chip of a spreading code to a block unit of vertical×horizontal=8 pixels (lines), which is a unit for compressing a digital video signal.

Phase inversion may be performed not alternately every vertical period, but every plural unit intervals. Also, one unit interval in plural unit intervals may be taken as an inverting interval, or any number of unit intervals in plural unit intervals may be taken as inverting intervals.

The reset period of the spreading code is not necessarily one vertical period, but may be plural vertical periods. Also, taking the reset period of the spreading code as one horizontal period or plural horizontal periods, the inverting unit interval may be taken as one pixel or plural pixel intervals.

Also, in the processing of the flowchart of FIG. 8 or FIG. 12, despreading of one or more bits of additional information can be performed by detecting whether or not the spectrally spread signal is superimposed and detecting the PN code sequence, and multiplying the detected PN code sequence by the digital signal S21 from the A/D converter 21.

When detection cannot be performed in one period of the spreading code, which in this example is one vertical interval, detection may be performed over plural vertical intervals and the spectrally spread signal detected by integrating over these plural vertical intervals. In this case there is no need that the threshold value is a plural vertical interval multiple of its value for one vertical interval, and it may be set smaller than a plural vertical interval multiple of its value for one vertical interval. This is because, when integration is performed over plural vertical intervals, the increase in the correlation between the video signal and PN code sequence is less than the increase in the correlation between the spectrally spread additional information signal and PN code sequence.

When detection is performed by the algorithm of FIG. 8 in the case of the second embodiment, as the correlation between the video signal and PN code sequence is not zero, detection of the inverted pattern every horizontal interval is relatively difficult. In this case, the nature of the inverted pattern may be detected by integrating the addition/subtraction value every other horizontal interval which is a non-inverting interval, integrating the addition/subtraction value over the remaining horizontal intervals which are inverting intervals, examining whether one of these integral values exceeds the positive threshold value or negative threshold value, and examining whether the other integral value exceeds the threshold value of different polarity.

In the aforesaid first and second embodiments, phase inversion was performed in a preset sequence taking a unit interval of the additional information as a unit. In this third embodiment, the phase inversion interval is randomly determined using a random sequence. As a result, it is more difficult to know in what way the additional information is superimposed on the video signal, and this therefore provides a greater level of protection against persons who try to illegally tamper with the video signal.

Specifically, according to the third embodiment, the timing signal generating unit 19 on the additional information superimposing side and the timing signal generating unit 25 corresponding to it have the construction shown in FIG. 14.

FIG. 14 shows the construction of the timing signal generation unit 19 in the case of the third embodiment, but the timing signal generation unit 25 has an identical construction. In the timing signal generating unit 19 of the third embodiment, the inverse timing signal generating unit 194 does not generate an inverse timing signal based only on the vertical sync signal V and horizontal sync signal H, but generates an inverse timing signal HTr based on random numbers from a random number generator 195.

When the inverting interval is determined taking 1/N spreading code intervals in one period of the spreading code as in the first embodiment, the random number generator 195 generates random numbers using the vertical sync signal V as a trigger as in the case of the PN code generating unit. On the additional information detecting side, the reverse timing signal HTr is generated based on random numbers from a random number generator of identical construction in the timing signal generating unit 25, so the unit intervals that are inverted can be identified. Therefore also in the case of the third embodiment, the additional information can be detected by the algorithm shown in FIG. 8 or FIG. 12.

When unit interval is taken as one or more times the spreading code period, a spectrally spread time code may for example be superimposed on the video signal as in the second embodiment, and random numbers generated based on this time code.

In the aforesaid description, the additional information was spectrally spread by one PN code sequence, however, it will be understood that the invention may be applied also to the case when the additional information comprises plural bits, different PN code sequences are superimposed depending on the bits, and the spectrally spread signal is detected by detecting these PN codes.

In the above embodiment, the spectrally spread additional information signal was converted to an analog signal and superimposed on an analog video signal, however the chip level (digital level) of a spectrally spread signal may also be superimposed at a very low level as a digital signal on a digital video signal.

This invention may be applied also to the case where, instead of spectrally spreading and superimposing additional information, a signal corresponding to each bit is superimposed on the video signal at a very low level which does not affect the reproduced image.

Moreover, in the aforesaid description, the invention was applied to a recording and playback system, but it may be applied also to the case where additional information is superimposed on the video signal and transmitted by various media, for example, radio waves, cables or infrared waves.

What is claimed:

1. A method for detecting additional information superimposed on a signal, comprising the steps of:
   generating a code;
   finding correlations between said code and each of predetermined intervals of said signal on which said additional information is superimposed;
   integrating results of correlation found from said predetermined intervals of said signal by adding the result when the result is found from a non-inverted interval and by subtracting the result when the result is found from an inverted interval; and
   determining said additional information superimposed on said signal based on a result of said integrating.

2. The method as claimed in claim 1, wherein
   said step of determining said additional information includes determining said additional information by judging whether said result of said integrating exceeds a predetermined threshold.

3. The method as claimed in claim 1, wherein
   said step of integrating results of correlation is performed by adding the result when the result is found from a non-inverted interval and by adding an inversion of the result when the result is found from an inverted interval.

4. The method as claimed in claim 1, wherein said step of finding correlations comprises
   finding a value of said signal for one of said predetermined intervals;
   finding a code value of said code for said one of said predetermined intervals;
   determining whether the value of said code is non-zero;
   adding the value of said signal to an accumulated addition/subtraction value when said code value is determined to be zero;
   subtracting the value of said signal from the accumulated addition/subtraction value when said code value is determined to be non-zero; and
   repeating said steps of finding a value of said signal, finding a value of said code, determining, adding, and subtracting for all of said predetermined intervals.

5. Apparatus for detecting additional information superimposed on a signal, comprising:
   a generator for generating a code;
   means for finding correlations between said code and each of predetermined intervals of said signal on which said additional information is superimposed;
   an integrator for integrating results of correlation found from said predetermined intervals of said signal by adding the result when the result is found from a non-inverted interval and by subtracting the result when the result is found from an inverted interval; and
   means for determining said additional information superimposed on said signal based on a result of said integrating.

6. The apparatus as claimed in claim 5, wherein
   said means for determining said additional information includes means for determining said additional information by judging whether said result of said integrator exceeds a predetermined threshold.

7. The apparatus as claimed in claim 5, wherein
   said integrator includes means for adding the result if the result is found from a non-inverted interval and for adding an inversion of result if the result is found from an inverted interval.

8. The apparatus as claimed in claim 5, wherein said means for finding correlations comprises:
   means for finding a value of said signal for one of said predetermined intervals;
   means for find a value of said code for said one of said predetermined intervals;
   means for determining whether the value of said code is non-zero;
   an adder for adding the value of said signal to an accumulated addition/subtraction value when said code value is determined to be zero; and
   a subtracter for subtracting the value of said signal from the accumulated addition/subtraction value when said code value is determined to be non-zero.

* * * * *